United States Patent
Mazur

(10) Patent No.: US 8,305,605 B2
(45) Date of Patent: Nov. 6, 2012

(54) COMPOSITION ENGINE RFID DATA STORE AND SCHEMA ELEMENT SYSTEM

(75) Inventor: Christopher A. Mazur, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 1429 days.

(21) Appl. No.: 11/818,857

(22) Filed: Jun. 18, 2007

(65) Prior Publication Data

US 2008/0309969 A1    Dec. 18, 2008

(51) Int. Cl.
*G06F 3/12* (2006.01)
(52) U.S. Cl. .............. 358/1.15; 358/1.13; 358/1.14; 715/736
(58) Field of Classification Search ........ 358/1.13–1.18; 715/736
See application file for complete search history.

(56) References Cited

U.S. PATENT DOCUMENTS

| | | | | |
|---|---|---|---|---|
| 6,739,512 B2 * | 5/2004 | Guerrero et al. | ......... | 235/462.01 |
| 7,242,302 B2 * | 7/2007 | Rai et al. | ............ | 340/572.1 |
| 7,466,411 B2 * | 12/2008 | Riley et al. | ........... | 356/399 |
| 7,466,441 B2 * | 12/2008 | Barry et al. | ........... | 358/1.15 |
| 7,603,288 B2 * | 10/2009 | Chang et al. | ........... | 705/22 |
| 7,688,794 B2 * | 3/2010 | Tredoux et al. | ......... | 370/338 |
| 7,839,523 B2 * | 11/2010 | Tredoux et al. | ......... | 358/1.15 |
| 7,855,799 B2 * | 12/2010 | Shah | ................. | 358/1.15 |
| 7,948,647 B2 * | 5/2011 | Matsunaga et al. | ...... | 358/1.15 |
| 2001/0055123 A1 * | 12/2001 | Ryan et al. | ............ | 358/1.12 |
| 2005/0034030 A1 * | 2/2005 | Wiechers | ........... | 714/44 |
| 2005/0182757 A1 * | 8/2005 | Hull et al. | ........... | 707/3 |
| 2006/0212164 A1 * | 9/2006 | Abraham et al. | ........ | 700/215 |
| 2006/0227366 A1 * | 10/2006 | Hohensee et al. | ...... | 358/1.15 |
| 2007/0041034 A1 * | 2/2007 | Gombert | ............ | 358/1.15 |
| 2008/0077465 A1 * | 3/2008 | Schimpf et al. | ........ | 705/8 |

* cited by examiner

*Primary Examiner* — Twyler Haskins
*Assistant Examiner* — Dennis Dicker
(74) *Attorney, Agent, or Firm* — Alix, Yale & Ristas, LLP

(57) ABSTRACT

A composition engine for a print shop includes a database having a unique identifier for each electronic data storage device associated with the print shop and print shop data. The composition engine also includes a schema element that associates a set of the data stored in the database with each print job and assigns the set of data to at least one electronic data storage device. The composition engine generates the print job and transmits the print job and the set of data to a printing device of the print shop as page description language. The set of data is stored on the electronic data storage device with a programming device associated with the printing device, the set of data including a unique identifier associated with the electronic data storage device on which the set of data is stored. The print job is printed and the electronic data storage device is attached to or printed on a page of the print job.

6 Claims, 2 Drawing Sheets

COMPOSITION ENGINE RFID DATA STORE AND SCHEMA ELEMENT SYSTEM

BACKGROUND

This disclosure relates generally to systems for the preparation of printed items. More particularly, the present disclosure relates to systems for verifying the integrity of print products.

Many print jobs prepared by modern print shops must be printed as multiple print runs due to differing specifications for each of the print runs. For example, the print job may require the use of different paper stocks for the different print run, or that portions of the print job be printed in black and white while other portions of the print job be printed in color. Completion of the print job therefore requires that the printed pages from the several print runs must be separated from printed pages for other print runs, matching those printed pages to the print job, collating the printed pages and packaging the print job for delivery to the customer.

It should be appreciated that the potential for damage to a print run can occur at any point of the printing process, including during binding and in packaging or fulfillment operations. Therefore, multiple inspection/verification points are required to ensure that print run quality is maintained.

In addition, the tasks recited above may each include a number of sub-tasks. For example, each print run requires supplying a set of printing instructions intended for printing a particular portion of the print job document to the printer device and then printing the document portion in accordance with the supplied sets of printing instructions. A number of mutually different processing instructions may be supplied to a station of an apparatus for assembling print jobs, which processing instructions are each associated with particular sets of the sets of printing instructions. Accordingly, the possibility exists that due to errors in the printing of the document portions or in the transport of printed document portions from the printer to the assembly station, an assembled document may include one or more printed document portions associated with another document. Such errors can occur, for instance, in that a document jams or in that a double sheet is supplied to the printer.

As a result of such errors, it is possible, for instance, that a set of personalized documents lacks a last document, which is then included in the next set, intended for a different addressee. It is also possible, for instance, that a bank statement is added to a letter which is addressed to a person other than the person to whose bank account the statement relates. It will be clear that these are extremely undesired consequences. In this connection, it is particularly disadvantageous that an error may have an effect on the assembly of subsequent postal items without this being noticed In one conventional method of quality control, document portions are provided with special marks, such as a glyph or barcode, which may be read by an optical scanning device. Although the special marks are relatively small, it is necessary, in determining the lay-out of the documents, to leave some space clear for the special marks, which requires additional coordination. Each time a quality control is performed on a document portion, the special marks are read and compared to a listing of the special marks associated with the document to ensure that all the document is complete and does not include any document portions not associated with the document. Since the special marks can only be read by optical scanning devices, each page of the document portion having special marks must be scanned by such a device, resulting in excessive cycle time.

SUMMARY

There is provided a composition engine for a print shop having at least one electronic data storage device associated with the print shop. The composition engine comprising a database including a unique identifier associated with each electronic data storage device associated with the print shop and print shop data selected from data associated with print jobs that have been completed in the print shop, data associated with print jobs that are in the process of being performed in the print shop, data associated with print jobs that are planned to be performed in the print shop, identification information of the print shop equipment, product codes and print shop metadata.

The composition engine further comprises a schema element that associates a set of the data stored in the database with each print job, and assigns the set of data to at least one electronic data storage device. The set of data includes the identifier associated with the electronic data storage device.

The set of data and the print job are transmitted from the composition engine as page description language to at least one printing device of the print shop. A programming device associated with the printing device stores the set of data associated with the print job on at least one electronic data storage device that is associated with the print job. The printing device attaches or prints the electronic data storage device on the print job.

There is also provided a method of operating a print shop having a composition engine including a database and a schema element. The method begins when a print job order is received at the print shop. A print job is generated from the print job order with the composition engine. A set of data from the data stored in the database is associated with the print job by the schema element. At least one electronic data storage device is also associated with the print job, and the set of data is assigned to the electronic data storage device.

The print job and the set of data are transmitted from the composition engine to a printing device of the print shop as page description language. The set of data is stored on the electronic data storage device with a programming device associated with the printing device. The set of data includes a unique identifier associated with the electronic data storage device on which the set of data is stored.

The print job is produced by printing the print job and attaching the electronic data storage device to a page of the print job or printing the electronic data storage device on a page of the print job.

The method further comprises periodically updating the database of the composition engine by removing the unique identifiers of electronic data storage devices that had been associated with a print job and adding the unique identifiers of replacement electronic data storage devices.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
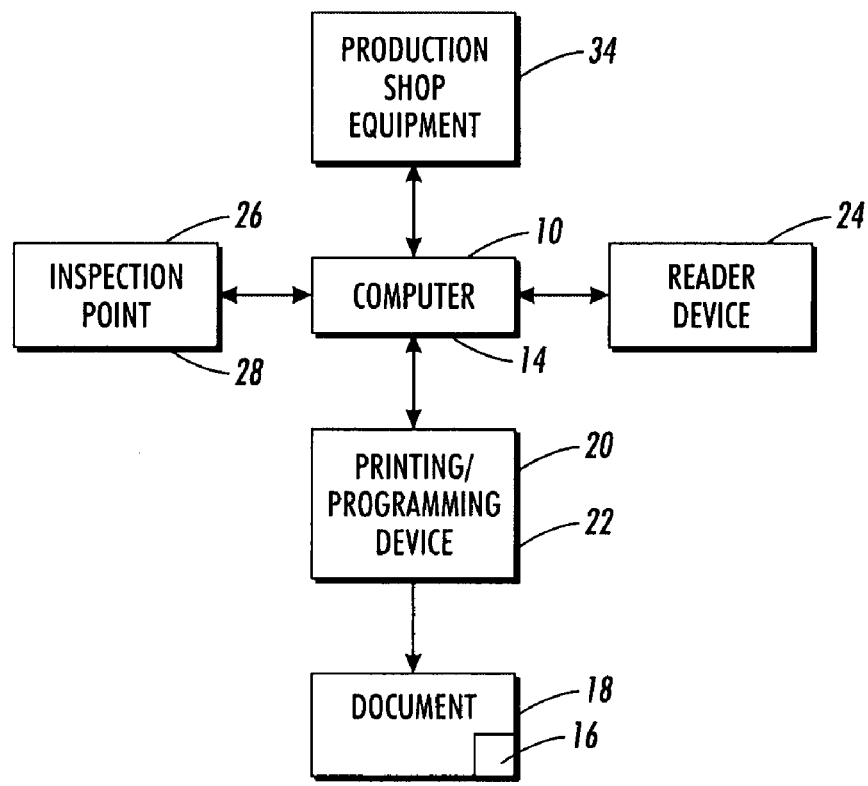
FIG. 1 is a schematic diagram of a print shop having a composition engine RFID data store and schema element system in accordance with the disclosure.
Figure 2:
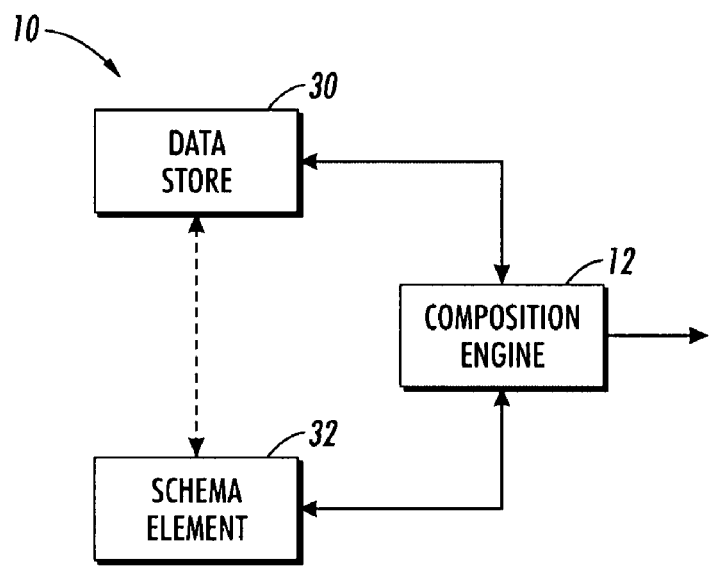
FIG. 2 is a schematic diagram of the composition engine of the print shop of FIG. 1.
Figure 3:
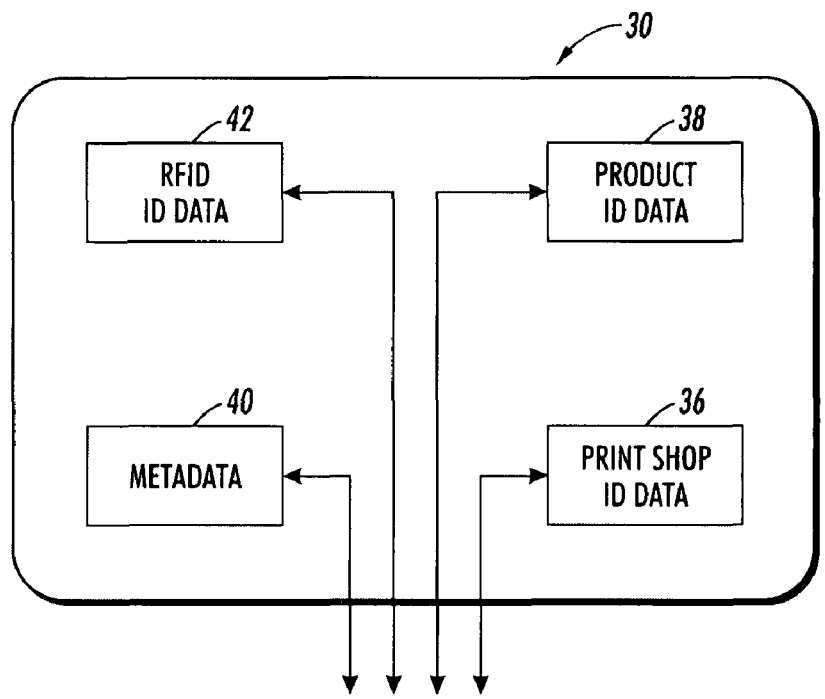
FIG. 3 is a schematic diagram of the RFID data store of FIG. 2.

With reference to FIGS. 1-3, a RFID data store and schema element system 10 is an integral portion of the print shop composition engine 12, which may be housed within a print shop computer 14, or a printing device computer. A "print shop" is hereby defined to be any combination of hardware, software, and/or operator intervention required to carry out the method described below. A "composition engine" is design software that produces the print job data stream. Microsoft Word™ and Adobe InDesign™ are examples of composition engines. The composition engine RFID data store and schema element system 10 stores data on one or more electronic data storage devices 16 that are attached to or incorporated into one or more pages of a printed product 18 by printing device 20 or programming device 22. The data stored therein may be read by reader devices 24 and/or inspection stations 26 having reader devices 28 at various locations in the print shop, allowing the workflows of the print shop to be streamlined and thereby improving print shop efficiency.

An "electronic data storage device" (EDSD) is a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices include, but are not limited to, radio frequency identification tags (RFID tags), proximity (Prox) tags, iButtons, smartcards, and similar devices. To facilitate discussion of the subject system 10, only a single type of EDSD, the RFID tag, shall be referred to hereafter in the detailed discussion.

Radio frequency identification (RFID) is a method of remotely storing and retrieving data using devices called RFID tags/transponders. Data stored in the RFID tag may be read by an RFID reader. Most conventional RFIDs are in the form of a tag, such as an adhesive sticker, that can be attached to or incorporated into a product. RFIDs that may be printed directly on a print media are in development.

The RFID data store 30 is a database for storing print shop data. Print shop data is hereby defined to be data related to the print shop and/or data related to print jobs that have been completed in the print shop, are in the process of being performed in the print shop, or are planned to be performed in the print shop. The print shop data stored in the RFID data store 30 is made available to the RFID schema element 32 during page assembly and PDL creation, as explained in greater detail below. Data stored in the RFID data store 30 may include the serial numbers 36 of the print shop equipment 34, product codes 38 and associated metadata 40. The data also includes the unique identifiers of RFID tags 16 associated with the print shop. For example, if the RFID tags 16 have identifiers 42 stored therein, these identifiers 42 will be included in the RFID data store 30. The RFID data store 30 may also include identifiers 42 that may be assigned to RFID tags 16 that do not already have identifiers stored therein. For example, one such identifier 42 may be stored in an RFID tag 16 that is printed directly on the print media. The RFID data store 30 can be implemented using existing open database connection (ODBC) technologies, native databases inherent to the composition engine, or a custom database added to the composition engine 12.

The RFID schema element 32 is a routine that associates data stored in the RFID data store 30 with specific print jobs and assigns such data to one or more RFID tags 16 that have been or are to be associated with the print job. In one example, the RFID schema element 32 will associate the identifier 42 of one of the RFID tags 16 allotted to the print shop with a page or page element of a print job (as required by the workflow) within the page description language (PDL) emitted by the composition engine 12. Multiple associations can be made by the RFID schema element 32 with each page (to the object level). For example, a page may include multiple page elements. Each of these page elements may have an RFID tag identifier 42 associated with it. This may be accomplished by associating a separate RFID tag 16 with each page element or by associating an RFID tag 16 with more than one page element. Similarly, other selected data stored in the RFID data store 30 may be associated with a print job and assigned to one or more RFID tags 16. For example, the PDL output may contain the RFID schema element metadata 40, which can be used in many additional facets of workflow, such as the DFE or in-line bindery. The appropriate piece of print shop equipment 34 is directed to attach the RFID tag(s) 16 on the page or print the RFID tag(s) 16 on the page.

Associating data stored in RFID tags 16 mounted to the pages of a print job provides many advantages in the management of workflow, compared to conventional workflow management systems. For example, one conventional method of print shop quality control utilizes special marks, such as a glyph or barcode, printed on the document to implement the system. Each time a quality control is performed on a document portion, the special marks are read and compared to a listing of the special marks associated with the document to ensure that all the document is complete and does not include any document portions not associated with the document. Since the special marks can only be read by optical scanning devices, each page of the document portion having special marks must be scanned by such a device, resulting in excessive cycle time. The pages of multi-page documents containing such special marks must be unstacked to allow marks on inner pages to be separated and read, and then restacked on completion of the quality control check. Document pages may be lost and/or non-document pages may be included while the document is disassembled. In some cases, documents may have to be unbound and then rebound at the completion of the quality control check. The document may be damaged during this operation.

The composition engine RFID data store and schema element system 10 takes advantage of the fact that RFID tags 16 do not require contact or line-of-sight communication to be read, and may be read through non-metallic materials, such as comprise most print media, and the human body. In the above example, all of the RFID tags 16 attached to or incorporated into a document 18 may be read at a quality control inspection point 26, whether or not there is line-of-sight communication between the RFID tags 16 and the reader device 24, 28. Accordingly, multi-page documents 18 do not have to be unbound to read the RFID tags 16 attached to inner pages of the document 18, eliminating the time required to separate the pages, route the individual pages through scanning devices, and reassemble the document 18. In addition, the potential for losing pages of the unbound document and incorporating stray pages into the document 18 is eliminated.

Figure 4:
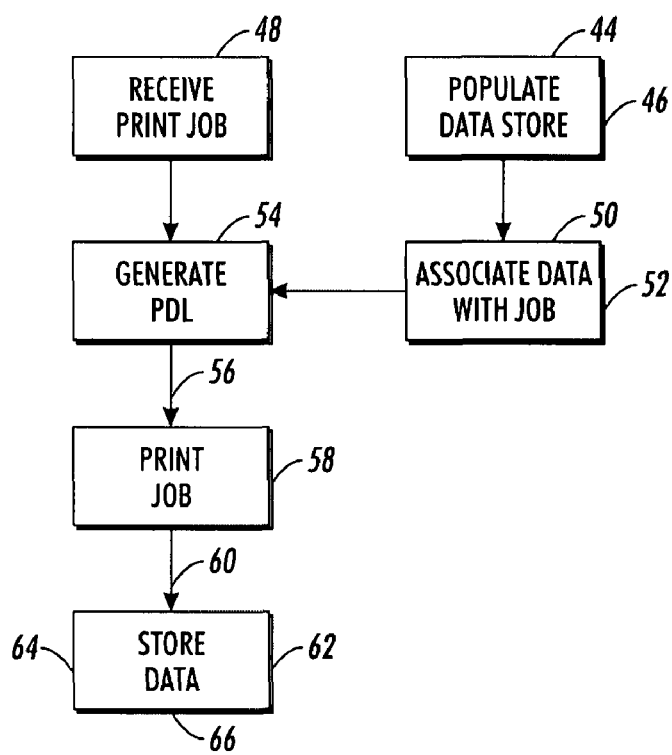
FIG. 4 is a flow diagram of a method of operation of a print shop having a composition engine RFID data store and schema element system.

With reference to FIG. 4, the RFID data store 30 is initially populated 44 with data when the composition engine RFID data store and schema element system 10 is first implemented in the print shop. Generally, this initial data input will include the serial numbers 36 of the print shop equipment 34, product codes 38, metadata 40 associated with the print shop, and the unique identifier 42 of RFID tags 16 associated with the print shop. Periodically the RFID data store 30 is updated 46. For example, the unique identifiers 42 of RFID tags 16 associated with completed print jobs are removed and the unique identifiers 42 of replacement RFID tags 16 are added. The RFID data store 30 may also be populated with data 38 related to print jobs that are in the process of being performed in the print shop, or are planned to be performed in the print shop, and scrubbed to remove data related to shipped print jobs.

After a print job order has been received 48 in the print shop, the schema element 32 associates 50 data stored in the RFID data store 30 with that print job, and assigns 52 such data to one or more RFID tags 16. The composition engine 12 includes this data in the page description language that is generated 54 to produce the pages of the print job. When the PDL is transmitted 56 to one or more printing devices 20 of the print shop to produce 58 the pages of the print job, it is also transmitted 60 to the appropriate piece of print shop equipment 22 to store 62 the data in the RFID tag(s) 16 and attach 64 the RFID tag(s) 16 on the page or print 66 the RFID tag(s) 16 on the page.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of operating a print shop having a composition engine including a database and a schema element, the database having data stored therein, the method comprising:
   receiving a print job order;
   generating a print job from the print job order with the composition engine;
   associating a set of data from the data stored in the database with the print job, with the schema element;
   associating at least one electronic data storage device with the print job;
   assigning the set of data to the at least one electronic data storage device, wherein assigning the set of data comprises storing the set of data on the electronic data storage device with a programming device associated with the at least one printing device, the set of data including a unique identifier associated with the electronic data storage device on which the set of data is stored; and
   periodically updating the database of the composition engine, updating comprising removing the unique identifiers of electronic data storage devices that had been associated with a print job and adding the unique identifiers of replacement electronic data storage devices.

2. The method of claim 1 further comprising transmitting the print job and the set of data from the composition engine to a printing device of the print shop after the set of data is associated with the print job.

3. The method of claim 2 wherein the print job and the set of data are transmitted to the printing device as page description language.

4. The method of claim 2 further comprising producing the print job by
   printing the print job; and
   attaching the electronic data storage device to a page of the print job or printing the electronic data storage device on a page of the print job.

5. The method of claim 1 further comprising populating the database of the composition engine with print shop data selected from data associated with print jobs that have been completed in the print shop, data associated with print jobs that are in the process of being performed in the print shop, data associated with print jobs that are planned to be performed in the print shop, identification information of each print shop equipment component, product codes and print shop metadata, when the composition engine database and schema element are first implemented in the print shop.

6. A method of operating a print shop having a composition engine including a database and a schema element, the database having data stored therein, the method comprising:
   receiving a print job order;
   generating a print job from the print job order with the composition engine;
   associating a set of data from the data stored in the database with the print job, with the schema element;
   associating at least one electronic data storage device with the print job;
   assigning the set of data to the at least one electronic data storage device, wherein assigning the set of data comprises storing the set of data on the electronic data storage device with a programming device associated with the at least one printing device, the set of data including a unique identifier associated with the electronic data storage device on which the set of data is stored;
   transmitting the print job and the set of data from the composition engine to a printing device of the print shop after the set of data is associated with the print job; and
   periodically updating the database of the composition engine, updating comprising removing the unique identifiers of electronic data storage devices that had been associated with a print job and adding the unique identifiers of replacement electronic data storage devices.

* * * * *